United States Patent [19]

Lubbering

[11] Patent Number: 5,755,537
[45] Date of Patent: May 26, 1998

[54] PORTABLE PRECISION DRILL

[75] Inventor: Johannes Lubbering, Herzebrock, Germany

[73] Assignee: Johannes Lubbering AG, Erlenstrasse, Switzerland

[21] Appl. No.: 648,177

[22] PCT Filed: Nov. 14, 1994

[86] PCT No.: PCT/EP94/03771

§ 371 Date: Jul. 16, 1996

§ 102(e) Date: Jul. 16, 1996

[87] PCT Pub. No.: WO95/14550

PCT Pub. Date: Jun. 1, 1995

[30] Foreign Application Priority Data

Nov. 23, 1993 [DE] Germany .................. 43 39 770.0

[51] Int. Cl.$^6$ .................. B23B 39/08; B23Q 15/12; B23Q 15/24; B23Q 11/10
[52] U.S. Cl. .................. 408/3; 408/10; 408/8; 408/16; 408/56; 408/57; 408/137
[58] Field of Search .................. 408/3, 8–13, 16, 408/56, 57, 137

[56] References Cited

U.S. PATENT DOCUMENTS

| 3,859,001 | 1/1975 | Hoddinott et al. | 408/10 |
| 4,076,442 | 2/1978 | Cox, Jr. et al. | 408/8 |
| 4,514,123 | 4/1985 | Johnstone et al. | 408/8 |
| 4,688,970 | 8/1987 | Eckman | 408/9 |
| 5,123,789 | 6/1992 | Ohtani et al. | 408/16 |
| 5,613,810 | 3/1997 | Bureller | 408/3 |

FOREIGN PATENT DOCUMENTS

| 6-023612 | 2/1994 | Japan | 408/16 |
| 2218268 | 11/1989 | United Kingdom . | |

Primary Examiner—Steven C. Bishop
Attorney, Agent, or Firm—Charles E. Baxley, Esq.

[57] ABSTRACT

A drill incorporates an axial feed drive, measuring system for determining the feed distance, a computer for controlling the axial feed drive as a function of the axial feed distance and a rotary drive for driving the tool spindle with pre-established on-load speed or pre-established torque or load moment. The flow or feed of cutting lubricant to the tool is controlled as a function of the pre-established on-load speed or the combination of the pre-established load moment, and the axial feed.

20 Claims, 4 Drawing Sheets

PORTABLE PRECISION DRILL

BACKGROUND OF THE INVENTION

The present invention relates generally to the field of portable drills and more particularly to a portable drill for fastening onto the drilling location of large workpieces for precision drilling work by means of a tool through which a liquid lubricant is conducted to the tool cutting edges, having a tool spindle which is displaceable in its axial direction by a separate drive with a tool holder, through which the lubricant is fed and a drive for the rotating axial advance of the tool spindle.

Such a drill is used in all precision drilling work in which the workpieces are of such a size that they cannot be drilled on stationary drilling machines. A preferred field of use of such drills is in the aeronautical industry in order, for instance, to produce, in airplane construction, those holes which are to be provided for the attachment between the fuselage and the wings. The drill in question is either arranged fixed on an auxiliary device or, in variable use, is employed in locking bushings, in templates, or in similar holding devices. Particularly exact precision of machining on the part of such drills is required upon the reaming of previously produced holes, for which purpose conical reaming tools having a conical shoulder are used.

THE PRIOR ART

The prior art related to drills including the drill shown in U.S. Pat. No. 4,688,970. U.S. Pat. No. 4,688,970 shows a drill which has a drive motor which assures the feeding of the work spindle towards the workpiece and back from it. Sensors are seated on the tool spindle in order to check that the drill complies with the working data determined over the working path, and in particular reaches the predetermined depth of drilling with the tool in order then to be withdrawn again from the borehole. Auxiliary means for detecting the top side of the workpiece in order to be able to determine the depth of penetration of the tool into the workpiece from that point are not present in the known apparatus. This is true also of other previously known drills which have only a single drive, both for the rotating of the tool spindle and for the feeding thereof. In these machines, when they are under load, the feed decreases also simultaneously with the speed of rotation; on the other hand, the basic speed of rotation upon idle travel must not be selected too high, so that the idle distances here can be moved over only with relatively low speed.

One essential disadvantage of the known drill machine lies in its high consumption of lubricant, this being a drilling liquid of high quality which is very expensive. The amount of lubricant fed is established empirically based on an estimate of the drilling or reaming process, regardless of the length of engagement of the tool. The drilling or reaming tools used for precision holes have, distributed over their entire cutting length, radial holes which are supplied from a central feed channel. Since the cutting agent is fed continuously in the known embodiments, overdosing takes place as long as the tool is not in engagement over its entire cutting length. Also upon the pulling back of the tool without drilling or reaming work, the lubricant continues to be fed, unutilized, in the known drills. As a whole, therefore, the consumption of lubricant is about ten times as high as required from a purely theoretical standpoint for the actual cutting process.

The known drills also have disadvantages structurally. The tool spindle is mounted at the rear of the machine in an axial conveying thread which is necessary for the feed. Despite additional supporting of the spindle in the front region of the machine, movements of radial deflection are unavoidable, which impairs the accuracy of the drilling. Furthermore, the machining distance, the drilling depth, cannot be precisely determined in the known machines since for this, a depth stop is required which is placed on the wall of the material surrounding the hole in question and which indicates that the drilling depth has been reached in the manner that the tool spindle comes against a corresponding stop on the inner end of the depth stop, as a result of which the feed is turned off.

Finally, the known drilling machines are complicated to adjust. Each tool is subject to wear and must be regularly replaced, must have its working stroke readjusted empirically in a testing shop. This is done by turning the tool spindles together with their aforementioned conveyor screw in and out of the corresponding threaded bushing for the feed, for which a partial assembling of the machine, at least in the front region of the mechanical drive, is necessary in order to be able axially to displace a setting or stop nut on the conveyor thread of the tool spindle which strikes against the inner end of the depth stop at the end of the working stroke.

OBJECT AND SUMMARY OF THE INVENTION

It is an object of the present invention to provide a portable precision drill which operates with a high degree of precision and is economical in the consumption of lubricant.

The foregoing and other objects and advantages of the present invention will appear more clearly hereinafter.

In accordance with the present invention there is provided a portable precision drill which incorporates a measuring system for determining the feed distance, a computer for controlling the feed drive as a function of the axial feed distance and a rotary drive for driving the tool spindle with pre-established on-load speed or pre-established torque or load moment. The flow or feed of lubricant to the tool is controlled as a function of the pre-established on-load speed or the combination of the pre-established load moment, and the feed.

It is essential for the invention to be able to operate the motor for the rotary drive always at full load either with the highest possible speed of rotation or with the greatest possible torque. It is optimal to adapt these operating parameters to the drilling output and therefore to work with the greatest possible drilling output. The separate feed drive, the feed speed of which is independent of the speed of rotation of the rotary drive, can be operated with a high feed speed at the start of the machining cycle when the tool is not yet in engagement with the material or only slightly in engagement with it, after which, as a function of the decrease in the speed of rotation of the rotary drive motor, the feed speed is reduced in accordance with a pre-established function. This control or regulation can also be effected as a function of the torque, which is dependent on the specific operating conditions, such as, for instance, the characteristics of the material. Suitable sensors for speed of rotation and/or torque are installed in the rotary drive and the suitable desired value to be set in each case can be derived in suitable manner so as to introduce it into the computer and evaluate it there.

As a result of the evaluation in the computer, the feed of the liquid lubricant is also controlled so that the smallest possible amount of lubricant is used. Thus, at the start of the machining process as long as the tool is only slightly in engagement with the material, only a small amount of lubricant is fed and the addition of lubricant is increased with increasing machining engagement.

The separation of rotary drive from feed drive affords the further advantage that towards the end of the drilling or reaming process, one can operate with only a slight feed, which greatly increases the precision of the machining upon full engagement of the tool. For this, there is necessary an exact determination of the instantaneous position of the tool, for which the measurement system for determining the feed distance serves. As a function of a reference point, the position at the time of the tool spindle in axial direction is determined, for which a so-called absolute distance measurement is provided. To this distance measurement system there is connected a sensor system which is placed on the surface of the workpiece to be machined in the direct vicinity of the tool engagement and establishes a reference point. Furthermore, the data of the specific tool employed can be entered into the computer of the apparatus and in this way the working stroke which enters into consideration in each case can be fixed so that up to the end of the fine drilling one can work precisely with the slight feed.

The measurement system for the feed distance makes it possible furthermore to operate with the highest possible feed of the separately developed feed drive until engagement of the tool, which considerably shortens the entire machining time so that the machining cycle requires only about one-third as much time as traditional machines.

The measurement system for determination of the feed distance makes it possible furthermore to establish the maximum wear of the tool in the manner that, for instance, comparative values are stored in the computer and the deviation from these reference values determined. Furthermore, the determination of the feed or working distance of the tool creates the possibility of temporarily withdrawing the tool even during the machining process so that, fort instance, problematic chips can be removed from the borehole.

The computer of the drilling machine serves for the evaluating of all data and for controlling the functions and operations. Furthermore, there is provided on the drilling machine a memory chip which bears the individual data of the machine and of the tool used, which are introduced upon overhaul or upon new use of the apparatus. At the beginning of each use, these data are interrogated and fed to the computer, evaluated in it so that the working distance and the lubricant feed can be determined. In this way, the maintenance data of the drill and of the tool can be pre-established so that the maximum wear is not exceeded. Via a data interface, the drill can be linked with another drill and/or a central computer so as to permit of central monitoring and evaluation of the operating data of the machines and tools.

DESCRIPTION OF THE DRAWINGS

Other important objects and advantages of the invention will be apparent from the following detailed description, taken in connection with the accompanying drawings, in which.

DETAILED DESCRIPTION OF THE INVENTION

Figure 1:
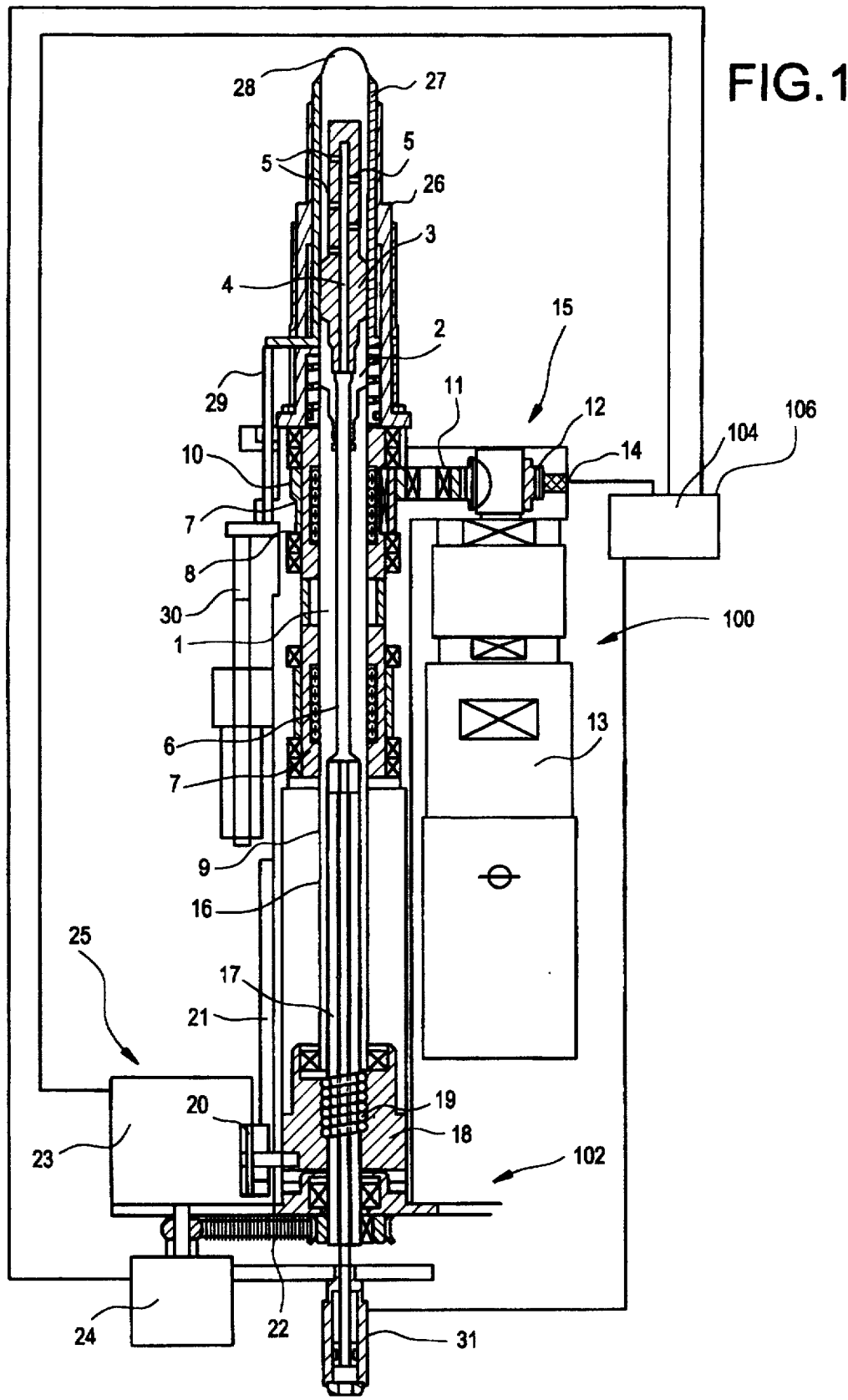
FIG. 1 is a diagrammatic view, partially in longitudinal section, of a portable precision drill made in accordance with the present invention.
Figure 2:
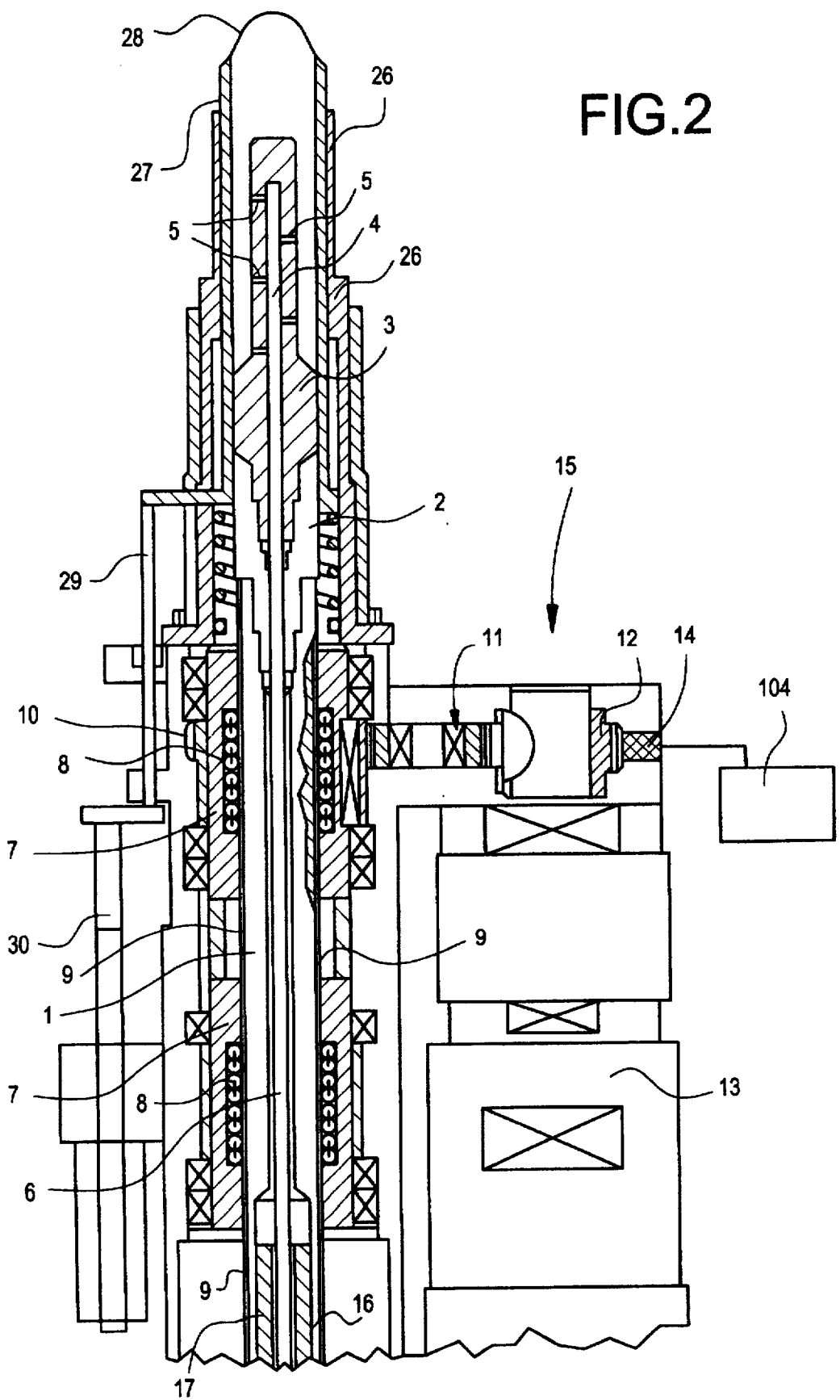
FIG. 2 is a view of the front region of the drill of FIG. 1, drawn to an enlarged scale.
Figure 3:
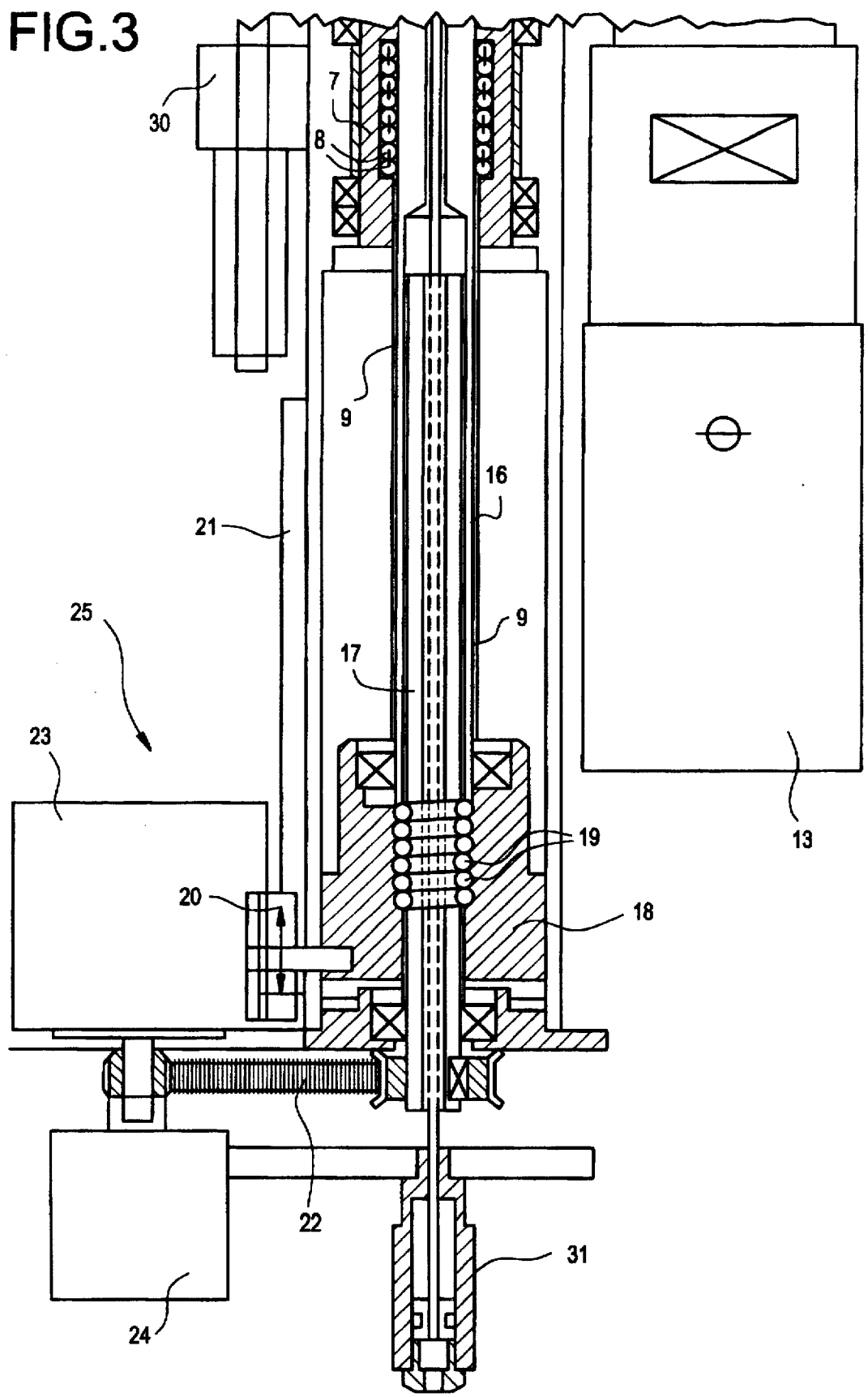
FIG. 3 is a view of the rear region of the drill of FIG. 1, drawn to an enlarged scale.

With reference to the drawings, wherein like reference numbers designate like or corresponding parts throughout, there is shown in FIGS. 1–3 a portable precision drill 100 made in accordance with the present invention which includes a tool spindle 1 mounted in a machine frame 102. The tool spindle 1 has a tool holder 2 at its front end. In it there is inserted a drilling or reaming tool 3 which has an axial channel 4 for the feeding of a lubricant to the tool cutting edges. Communicating the axial channel 4 there are transverse holes 5 which are arranged over the entire length of the cutting region of the tool 3. The feeding of the lubricant to the tool 3 takes place through the tool spindle 1 which, for this purpose, has an axial channel 6 which extends further in axial direction up to the rear end of the drill 100.

In order to effect the advance of the tool 3 upon the machining process, the tool spindle 1 is mounted for displacement in its axial direction. For this there are provided two bushings 7 which are rotatably supported in the machine frame 102 and have within them para-axial longitudinal grooves in which balls 8 are arranged. Balls 8 engage in para-axial longitudinal grooves 9 in the tool spindle 1 so that the tool spindle 1 can turn with the rotatably mounted bushings 7 and, independently thereof, be pushed in axial direction with respect to the bushings 7. In order to avoid radial play of the tool spindle 1 as far as possible, the bushings 7 are arranged at the greatest possible distance from each other. Thus, in the withdrawn end position of the tool spindle 1, the tool holder 2 lies directly at the outlet end of the front bushing 7, referred to the direction of feed. In the same way, the rear end of the tool spindle 1 in the advanced end position lies directly at the entrance end of the rear bushing 7.

The tool spindle 1 is placed in rotation by a rotary drive 15 which includes a gear rim 10 which is seated on the outer circumferential side of the front bushing 7. Via a toothed gearing 11 this gear rim 10 on the bushing 7 is in engagement with an output gear 12 of a motor 13 which is arranged para-axial to the tool spindle 1. The motor 13 can be a compressed-air motor which is of relatively high power but of small size.

The motor 13 is operated under load with a predetermined speed of rotation so that the tool spindle 1 and thus the tool 3 are also maintained at a given speed of rotation. The motor 13 can thus be operated in the most favorable power range, in which connection it itself need not be further controlled or regulated.

Rather, merely the speed of rotation of the rotary drive 15 is detected, for which purpose a speed measuring device 14 is seated at a suitable place in the rotary drive 15. The speed-dependent signal of the speed measuring device 14 is introduced into a computer 104 which, on the basis thereof, determines the feed speed for the tool spindle 1. The computer 104 is illustrated schematically by the rectangle 106 in FIG. 1. The computer 104 is connected to the lubricant feed device 31 and to the feed drive 25 by conventional connections. As long as the speed of rotation of the rotary drive 15 for instance at the start of a machine cycle has still not dropped to the optimal on-load speed, one can operate with an increased feed, which is completely uncoupled mechanically from the speed of rotation of the rotary drive 15. Instead of a compressed-air motor there can also be used as motor 13 an electric motor which, in addition, affords the possibility of being operated with a predetermined load moment, which can be determined via the current consumption of the electric motor.

The computer 104 controls a feed drive 25 in the manner that upon the idle travel over which the tool 3 is not in engagement with the material, one can operate with maximum speed of feed, which is true both for the start of an operating cycle and for the extracting of the tool. Furthermore, the feed drive 25 is so regulated that optimal cutting conditions with due consideration of the most favorable on-load speed of the motor 13 are maintained. In this connection furthermore, a distinction is made between normal machining and precision machining, high speed of rotation and low feed being used in the latter case.

As shown in FIGS. 1 and 3, the feed drive 25 comprises a rotatably mounted threaded spindle 17 which is not displaceable in axial direction. The threaded spindle 17 engages into a hollow section 16 in the region of the rear end of the tool spindle 1. On the threaded spindle 17 a nut 18 is arranged in such a manner that it is fixed in direction of rotation, this being assured by a carriage 20 which is guided on a para-axial guide 21 on the machine frame. This guide 21 extends over a region of axial displacement of the nut 18 which coincides with the total feed distance of the tool spindle 1. The rear end of the hollow section 16 of the tool spindle 1 is rotatably supported in the nut 18, but is firmly attached in axial direction with the displaceable nut 18. By means of rotary balls 19 which engage both in the threaded spindle 17 and in a mating thread of the nut 18, the axial displacement of the nut 18 and thus the feed of the tool spindle 1 are effected upon rotation of the threaded spindle 17. The rotary drive of the threaded spindle 17 is effected via a belt transmission 22 by means of a feed motor 23, which can be a stepping motor.

The belt drive 22 furthermore drives a measurement system 24 which consists predominantly of an incremental rotary transducer. Via the signals supplied by the rotary transducer, the feed distance of the tool spindle 1 can be precisely determined so that an absolute measurement of the distance is possible. The measurement system 24 is connected in corresponding manner with the computer 104 or the drill machine 100, so as to control the feed of the tool 3 for the predeterminable idle distances as well as the machining and precision machining distances via the feed drive 25 and possibly readjust it as a function of the speed of rotation of the tool spindle 1 which can be detected via the speed of rotation measuring device 14.

As further shown in FIG. 1, the measurement system 24 can be supplemented for the detection of the feed distance by means of a depth sensor which is connected by a rod 29 to a feeler tube 27 which is arranged in a sleeve 26 which surrounds the tool 3 in its withdrawn end position. The feeler tube 27 also surrounds the tool 3 and has a feeler nose 28 which can be placed on the material of the workpiece in question in the region of the edge of the hole to be machined. Since the distance between the tool and the feeler end of the feeler nose in its fully extended position is known, a reference signal for the tool spacing in the initial position can be determined via the feeler sensor 30 via the distance of indentation of the seated feeler nose 28 when the drill is placed on a workpiece. In particular, in this way it is possible to establish a zero point for the control or regulating of the computer 104 in cooperation with the measurement system 24.

Figure 4:
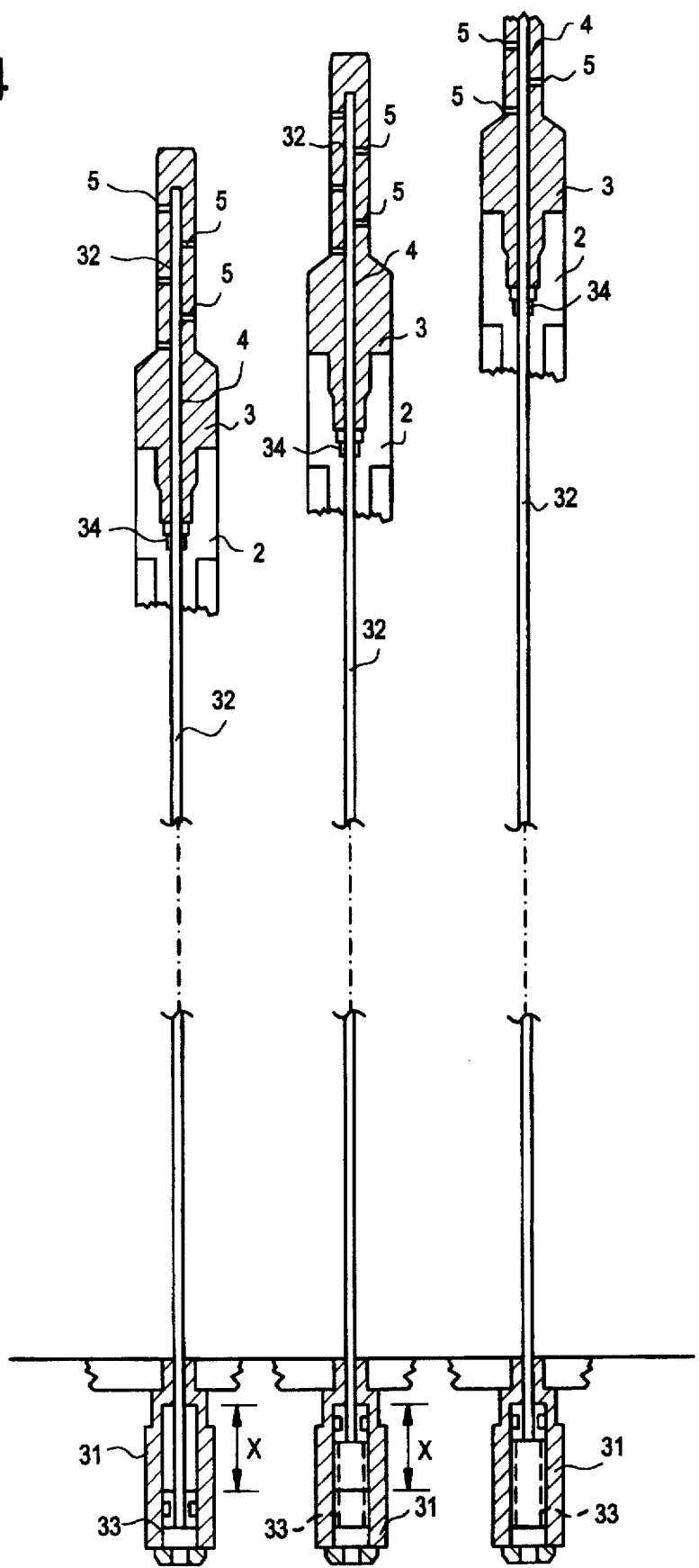
FIG. 4 is a diagrammatic view of the feeding of lubricant to the tool of the drill of FIG. 1, showing three different positions of the tool.

From FIG. 1 it can furthermore be noted that the axial channel 6 for the feeding of the lubricant to the tool 3 extends not only through the tool spindle 1 but also through the threaded spindle 17 up to a lubricant feed device 31 which is placed on the rear end of the drill 100. In the axial channel 6 a lance 32 in the form of a small tube is present, as can be noted in detail from FIG. 4. The lubricant is transported through this lance 32 from the lubricant feed device 31 to the tool 3 in such a manner that it emerges there through the corresponding transverse holes 5 which adjoin the lubricant channel 4 of the tool 3 only when it is also actually used. This is the case upon engagement by the tool 3 with the material of workpiece but not upon the empty paths which the tool 3 has moved over at the start of an operating cycle and upon the withdrawal from the hole drilled. When the tool 3 is withdrawn, the lance 32 extends so far into the lubricant channel 4 of the tool that all the transverse holes 5 are closed. Over the first idle path which the tool must move over up to the borehole, the lance 32 travels along so as to keep all the transverse holes 5 closed, as previously. For this purpose, the lance 32 is held displaceable by the distance "X" in axial direction in the lubricant feed device 31, in which connection it is pressed by means of a rear spring 33 in the direction towards the tool holder 2 of the tool spindle 1. When the lance 32 has reached in feed direction the end of the axial displacement path, a relative movement takes place between the lance 32 and the tool 3 upon the further feeding of the tool 3, in the manner that, starting with the front transverse hole 5, the transverse holes 5 are gradually unblocked for the emergence of the lubricant. Upon the pulling out of the tool 3, the transverse holes 5 are closed in the reverse sequence, and the relative movement between the tool 3 and the lance 32 ends as soon as the lance 32 is seated at the front end of the axial lubricating channel 4 of the tool 3. Instead of this, there can also be provided a different driving device 34 in order to effect the pushing back of the lance 32 into the starting position.

The computer 104 of the drill 100 also controls the lubricant feed device 31 since the need for lubricant is not only dependent on the distance but must also be adapted to the specific operating conditions, such as the main machining process or the precision m machining. The lubricant feed device 31 conveys the lubricant in portions into the lance 32, in which connection air bubbles between the individual portions of lubricant are forced into the lance 32. In this way, the lubricant is atomized upon emergence from the transverse holes 5 of the tool 3, assuring a uniform wetting of the cutting places. Furthermore, the lubricant feed device 31 can be operated in a variable pulse-pause ratio, in which case, for the duration of the pulse, either only lubricant or portions of lubricant with air bubbles are introduced into the lance 32, while for the duration of the pauses, only air is introduced into the lance 32. In particular, in this way one can avoid the possibility that a residual volume of lubricant which is still present in the entire lubricant feed line is discharged out of the transverse holes upon the pulling back of the tool 3.

The computer 104 performs an evaluation of all data and controls the functions and operations of the drill 1. Furthermore, there is provided in the computer 104 a memory chip which bears the individual data of the drill machine 1 and of the tool 3 used, which are introduced upon overhaul or upon new use of the apparatus 1. At the beginning of each use, these data are interrogated and fed to the computer 104, evaluated in it so that the working distance and the lubricant feed can be determined. In this way, the maintenance data of the drill 1 and of the tool 3 can be pre-established so that the maximum wear is not exceeded. Via a data interface, the drill 1 can be linked with another drill 1 and/or a central computer so as to permit of central monitoring and evaluation of the operating data of the machines and tools 3.

The foregoing specific embodiments of the present invention as set forth in the specification herein are for illustrative purposes only. Various deviations and modifications can be made within the spirit and scope of this invention, without departing from the main theme thereof.

I claim:

1. A portable drill for performing drill operations on a workpiece comprising:

a frame;

a tool spindle displaceably mounted on said frame;

feed drive means mounted on said frame and connected to said tool spindle for displacement of said tool spindle;

rotary drive means for rotation of said tool spindle;

measurement system means mounted on said frame;

depth sensor means mounted on said measurement system means for detecting feed distance of said tool spindle;

computer means mounted on said frame for regulating said feed drive means with said computer means connected to said rotary drive means and to said feed drive means for the purpose of regulating said feed drive means as a function of decrease in speed of said rotary drive means during operation with a decrease in said feed drive speed corresponding to a decrease in said rotary drive speed;

axially displaceable feeler nose means disposed generally para-axially with respect to said tool spindle for the purpose of making contact with said workpiece for detecting a reference portion of said workpiece; and lubricant feeding means mounted on said frame for feeding lubricant as a function of said rotary drive speed.

2. A drill according to claim 1, further comprising:

tool spindle mounting means for mounting said tool spindle in said frame with said tool spindle mounting means comprising:

a rotatable bushing connected to said rotary drive means;

a groove member of said tool spindle with said groove member having a plurality of generally para-axial grooves;

a groove member of said rotary drive means, with said groove member having a plurality of generally para-axial grooves; and a plurality of balls, with said balls engaging said groove member of said rotary drive means and said tool spindle thereby forming a driving connection.

3. A drill according to claim 2, wherein said tool spindle mounting means comprises:

a first bushing and a second bushing, with said first bushing spaced apart from said second bushing and with said tool spindle having a first end and a second end and with said tool spindle capable of an extended position and a retracted position, with said first and said second bushing spaced apart to support said tool spindle when said tool spindle is in said extended position and in said retracted position.

4. A drill according to claim 1, wherein said rotary drive means comprises a motor, with said motor disposed generally paraxially relative to said tool spindle mounting means and disposed generally proximate to said tool spindle mounting means.

5. A drill according to claim 1, further comprising:

a speed indicator disposed on said rotary drive means.

6. A drill according to claim 1, wherein said feed drive means comprises:

a rotatably mounted threaded spindle;

a nut, with said nut threaded onto said threaded spindle with said, nut fixed in the direction of rotation and displaceable in axial direction along said threaded spindle, with said nut connected to said tool spindle.

7. A drill according to claim 6, wherein said tool spindle comprises:

a hollow section, with said threaded spindle projecting into said hollow section and with said nut axially disposed on said tool spindle.

8. A drill according to claim 6, further comprising:

a feed motor, with said feed motor connected to said threaded spindle; and incremental rotary transducer means with said incremented rotary transducer means connected to said threaded spindle for measurement of feed distance of said tool spindle.

9. A drill according to claim 8, wherein said feed motor and said incremental rotary transducer means are disposed on said tool spindle generally diametrically opposite said rotary drive means.

10. A drill according to claim 1, comprising:

an axial channel portion formed in said tool holder, and an axial channel portion formed in said tool spindle with said channel portion in said tool holder communicating with said channel portions in said tool spindle for feeding of lubricant;

said lubricant feed means mounted on said tool spindle and communicating with said channel portion in said tool spindle for feeding lubricant through said channel portion in said tool spindle and through said channel portion in said tool holder.

11. A drill according to claim 10, further comprising:

a hollow tool mounted in said tool holder;

a hollow lance, with said hollow tool having a plurality of transverse hole portions, and with said hollow lance disposed projecting into said hollow tool and projecting into said axial channel portion formed in said tool spindle.

12. A drill according to claim 11, wherein said hollow tool has a withdrawn position and an extended position and in which said lance is of such a length so that when said hollow tool is in said withdrawn position, said transverse hole portions are blocked, and as said hollow tool advances toward said extended position, said transverse hole portions gradually open.

13. A drill according to claim 11, further comprising:

said lubricant feed means disposed to feed lubricant into said hollow lance.

14. A drill according to claim 10, in which said lubricant feed means is disposed to feed lubricant into said axial channel portion in said tool spindle intermittently with air bubbles introduced between portions of lubricant.

15. A drill according to claim 11, wherein said lubricant feed means is disposed to introduce lubricant into said hollow lance intermittently with air bubbles introduced between portions of lubricant.

16. A drill according to claim 10, further comprising:

said computer means connected to said lubricant feed means, with said computer means capable of a variable pulse-pause ratio operation defined as directing the flow of only lubricant or lubricant with air bubbles into said hollow lance during pulse operation and directing the flow of only air into said hollow lance during pause operation.

17. A portable drill for performing drill operations on a workpiece comprising:

a frame;

a tool spindle displaceably mounted on said frame;

feed drive means mounted on said frame and connected to said tool spindle for displacement of said tool spindle;

rotary drive means for rotation of said tool spindle;

measurement system means mounted on said frame;

depth sensor means mounted on said measurement system means for detecting feed distance of said tool spindle;

computer means mounted on said frame for regulating said feed drive means, with said computer means connected to said rotary drive means and to said feed drive means for the purpose of regulating said feed drive means as a function of decrease in speed of said rotary drive means during operation, with a decrease in said feed drive speed corresponding to a decrease in said rotary drive speed;

axially displaceable feeler nose means disposed generally para-axially with respect to said tool spindle for the purpose of making contact with said workpiece for detecting a reference portion of said workpiece; and lubricant feeding means mounted on said frame for feeding lubricant as a function of load moment and feed distance.

18. A drill according to claim 1, wherein said rotary drive means comprises motor means and further comprising:

speed indicator means disposed on said motor means.

19. A drill according to claim 11, further comprising:

said lubricant feed means disposed to feed lubricant into said axial channel portion in said tool spindle.

20. A drill according to claim 11 further comprising:

spring means, with said spring means disposed to urge said lance in a feed direction relative to said tool.

* * * * *